(12) United States Patent
Jiang et al.

(10) Patent No.: US 11,354,749 B2
(45) Date of Patent: Jun. 7, 2022

(54) COMPUTING DEVICE FOR MACHINE LEARNING BASED RISK ANALYSIS

(71) Applicant: SAP SE, Walldorf (DE)

(72) Inventors: Yang Jiang, Shanghai (CN); Xiangyu Pang, Shanghai (CN); Baiquan Liu, Shanghai (CN); Dong Wang, Shanghai (CN)

(73) Assignee: SAP SE, Walldorf (DE)

( * ) Notice: Subject to any disclaimer, the term of this patent is extended or adjusted under 35 U.S.C. 154(b) by 858 days.

(21) Appl. No.: 15/499,870

(22) Filed: Apr. 27, 2017

(65) Prior Publication Data
US 2018/0314977 A1    Nov. 1, 2018

(51) Int. Cl.
*G06Q 40/02* (2012.01)
*G06Q 40/08* (2012.01)
*G06N 20/00* (2019.01)
*G06N 20/10* (2019.01)
*G06N 5/04* (2006.01)

(52) U.S. Cl.
CPC ............ *G06Q 40/08* (2013.01); *G06N 5/045* (2013.01); *G06N 20/00* (2019.01); *G06N 20/10* (2019.01); *G06Q 40/02* (2013.01)

(58) Field of Classification Search
CPC ........ G06N 20/00; G06N 20/10; G06N 5/045; G06Q 40/02
See application file for complete search history.

(56) References Cited

U.S. PATENT DOCUMENTS

| | | | | |
|---|---|---|---|---|
| 6,112,190 A * | 8/2000 | Fletcher | ................. | G06Q 40/00 705/35 |
| 10,489,861 B1* | 11/2019 | Ross | ...................... | G06Q 40/08 |
| 10,949,852 B1* | 3/2021 | Kramme | ............ | G06Q 20/3224 |
| 2007/0016542 A1* | 1/2007 | Rosauer | ................. | G06N 5/022 706/21 |
| 2016/0048766 A1* | 2/2016 | McMahon | ............. | G06N 5/047 706/12 |
| 2016/0232546 A1* | 8/2016 | Ranft | .................... | G06Q 40/025 |
| 2017/0124662 A1* | 5/2017 | Crabtree | ................ | G06Q 40/08 |
| 2017/0243140 A1* | 8/2017 | Achin | ....................... | G06N 5/02 |
| 2018/0218453 A1* | 8/2018 | Crabtree | ............ | G06Q 30/0202 |
| 2019/0180379 A1* | 6/2019 | Nayak | .................... | G06Q 40/08 |

OTHER PUBLICATIONS

Cortes, Corinna, and Vladimir Vapnik. "Support-vector networks." Machine learning 20, No. 3 (1995): 273-297. (Year: 1995).*
Bernauer, "Programming Exercise 1: Linear Regression," mlbernauer.github.io, *github*, Feb. 19, 2015, 7 pages.
(Continued)

*Primary Examiner* — Alexey Shmatov
*Assistant Examiner* — Casey R. Garner
(74) *Attorney, Agent, or Firm* — Klarquist Sparkman, LLP

(57) ABSTRACT

Described herein is computing device for machine learning based risk analysis and decision automation in intelligent underwriting. In accordance with one aspect of the framework, input data of underwriting cases is preprocessed and used to train a predictive model. The predictive model may be cross-validated and tested for accuracy. The predictive model may then be applied to a current underwriting case in order to automatically identify and assess associated risks and provide a decision recommendation.

19 Claims, 5 Drawing Sheets

(56) References Cited

OTHER PUBLICATIONS

Brownlee, "How to Estimate Model Accuracy in R Using The Caret Package," machinelearningmastery.com, archived May 26, 2016, 12 pages.

Brownlee, "How to Choose The Right Test Options When Evaluating Machine Learning Algorithms," machinelearningmastery.com, Feb. 14, 2014, 18 pages.

Frossard, "Multiple Linear Regression," cs.toronto.edu/~frossard, May 29, 2016, visited Jun. 15, 2020, 7 pages.

* cited by examiner

300

COMPUTING DEVICE FOR MACHINE LEARNING BASED RISK ANALYSIS

TECHNICAL FIELD

The present disclosure relates generally to a computing device for machine learning based risk analysis, and more specifically, to a computing device for machine learning based risk analysis and decision automation in intelligent underwriting.

BACKGROUND

Risk analysis and risk management is a core process for global financial institutions. Risk management accounts for not only the profitability of financial institutions, but also the survival of financial institutions. Underwriting is a type of risk management process which a financial institution (e.g., bank, insurance company, investment house) uses to determine whether or not to guarantee payment in case of damage or financial loss, and accept the financial risk for liability arising from such guarantee.

Each financial institution has its own set of underwriting rules to determine whether or not the institution should accept the risk. To identify and control the risk of the applicant effectively, the rules can be very complicated. High volumes of underwriting cases typically require more underwriting employees to be recruited by financial institution, which leads to high cost and low efficiency. In the insurance industry, for example, insurers incur high costs for hiring underwriters, especially with billions of policies, even though most of the underwriting cases are duplicated. Underwriters in insurance companies spend a lot of working time manually checking the integrity of evidence from policy applicants.

SUMMARY

A computing device for machine learning based risk analysis for intelligent underwriting is described herein. In accordance with one aspect of the computing device, input data of underwriting cases is preprocessed and used to train a predictive model. The predictive model may be cross-validated and tested for accuracy. The predictive model may then be applied to a current underwriting case in order to automatically identify and assess associated risks and provide a decision recommendation.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present computing device and methods and in order to meet statutory written description, enablement, and best-mode requirements. However, it will be apparent to one skilled in the art that the present computing device and methods may be practiced without the specific exemplary details. In other instances, well-known features are omitted or simplified to clarify the description of the exemplary implementations of the present computing device and methods, and to thereby better explain the present computing device and methods. Furthermore, for ease of understanding, certain method steps are delineated as separate steps; however, these separately delineated steps should not be construed as necessarily order dependent in their performance.

A computing device for machine learning based risk analysis for intelligent underwriting is described herein. One aspect of the present computing device provides a machine learning model that is trained to identify and assess risks in underwriting cases. The machine learning model may propose a decision recommendation (e.g., accept or decline) and a fact-based summary (e.g., high risk items) for each underwriting case. Advantageously, the computing device is able to quickly and automatically process high volumes of underwriting cases, thereby reducing the cost of underwriting while improving efficiency and accuracy. With the present computing device, tedious underwriting tasks can be performed automatically and efficiently, thereby enabling the underwriter to focus on more profitable work.

For purposes of illustration, the present computing device may be described in the context of the insurance industry (e.g., life, property, automobile or medical insurance). However, the computing device may be applied in other industries or applications, such as banking or securities industries (e.g., credit card or loan applications). It should also be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
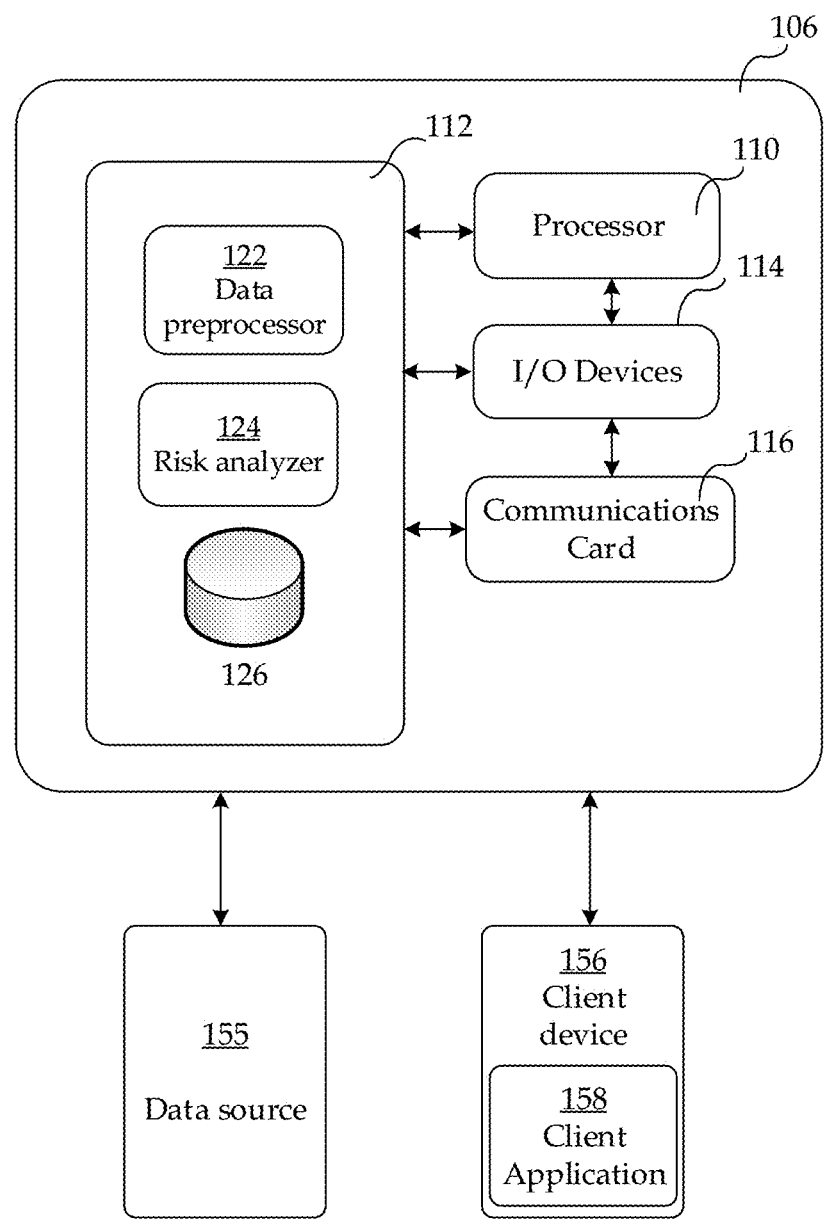
FIG. 1 is a block diagram illustrating an exemplary architecture.

FIG. 1 is a block diagram illustrating an exemplary architecture 100 in accordance with one aspect of the present framework. Generally, exemplary architecture 100 may include a computing device 106, a data source 155 and one or more client devices 156a-b.

Computing device 106 is capable of responding to and executing instructions in a defined manner. Computing device 106 may include a processor 110, input/output (I/O) devices 114 (e.g., touch screen, keypad, touch pad, display screen, speaker, etc.), a memory module 112 and a communications card or device 116 (e.g., modem and/or network adapter) for exchanging data with a network (e.g., local area network or LAN, wide area network or WAN, Internet, etc.). It should be appreciated that the different components and sub-components of the computing device 106 may be located or executed on different machines or systems. For example, a component may be executed on many computing devices connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computing device 106 is a general-purpose computing device that becomes a specific-purpose computing device when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG; Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes a data preprocessor 122 and a risk analyzer 124 for implementing the techniques described herein. Memory module 112 may further include other components, such as database 126. Database 126 may store and organize, for example, training and current financial data associated with underwriting cases.

Computing device 106 may operate in a networked environment using logical connections to a data source 155 and one or more client devices 156a-b. The data source 155 may serve to collect and store financial data for processing by the computing device 106. The computing device 106 may distribute results of such data processing to one or more client devices 156a-b. Client device 156 may include client application 158 configured to present a user interface (e.g., graphical user interface) to access the underwriting-related information and services, including services provided by computing device 106.

Figure 2:
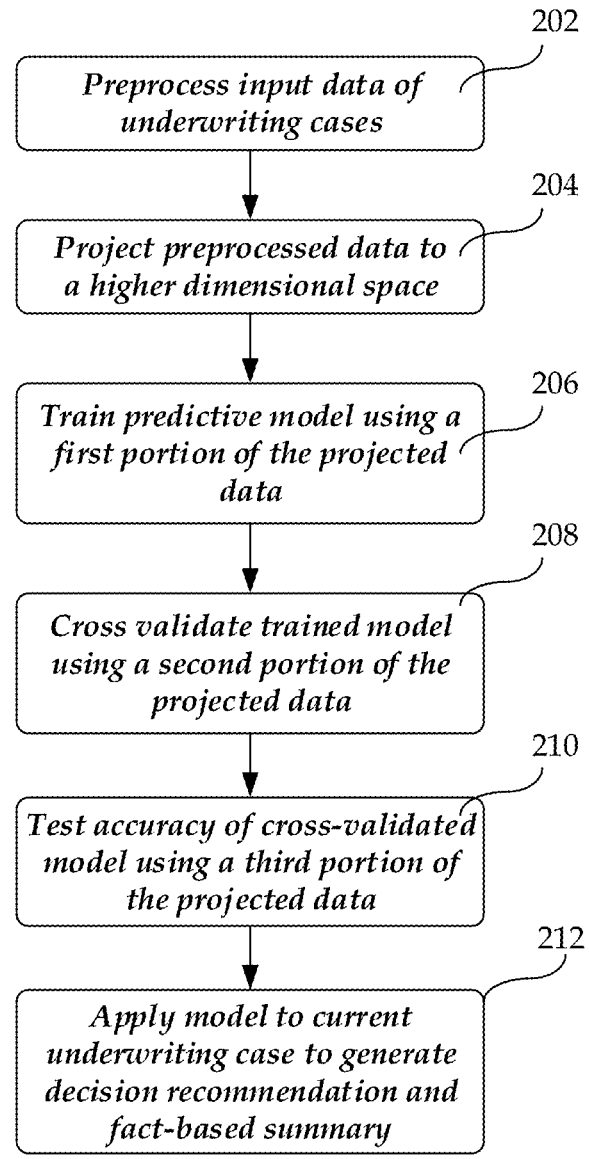
FIG. 2 shows an exemplary method for intelligent underwriting.

FIG. 2 shows an exemplary method 200 for intelligent underwriting. The method 200 may be performed automatically or semi-automatically by the system 100, as previously described with reference to FIG. 1. It should be noted that in the following discussion, reference will be made, using like numerals, to the features described in FIG. 1.

At 202, data preprocessor 122 preprocesses input data of underwriting cases. The input data may be retrieved from, for example, data source 155 and/or database 126. The input data is associated with a set of underwriting cases. Each underwriting case is associated with an application for a financial product (e.g., insurance, loan, credit card) that requires underwriting for risk evaluation. The input data may include, but is not limited to, information of type of financial product applied for (e.g., insurance policy type, such as life, automobile, property, medical insurance), sales channel, acquisition type, applicant type (e.g., one or more persons, business), calculation rule type, country, applicant information (e.g., tax payer information), premium tax scope, premium payer, insured person (or beneficiary), etc.

Figure 3:
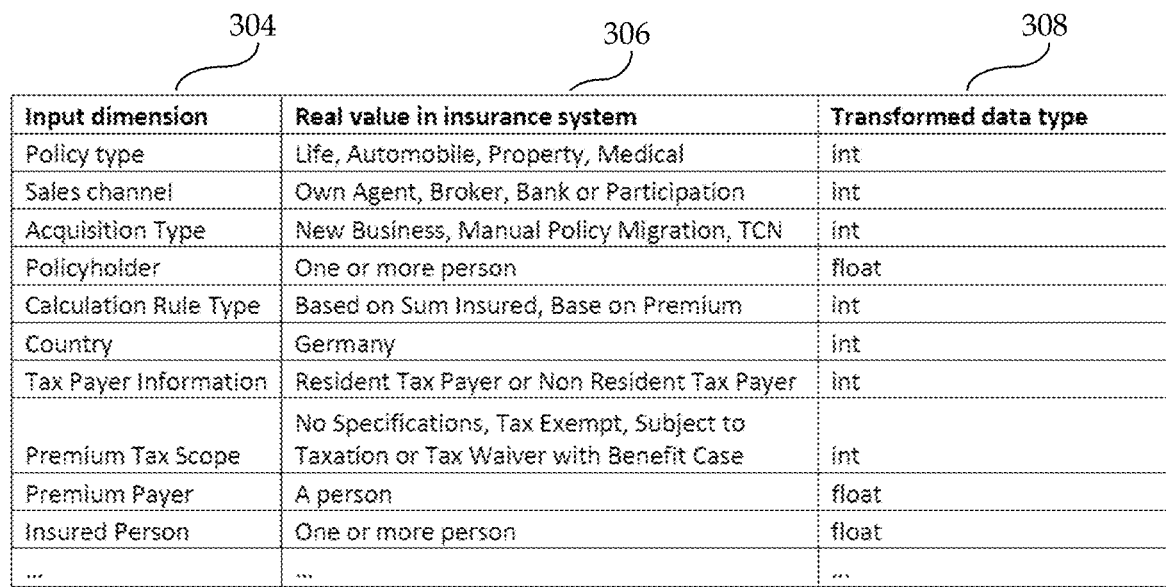
FIG. 3 shows an exemplary table that illustrates the transformation of input dimensions to compatible data types.

The input data may be preprocessed to transform the raw data to values of one or more data types that are compatible with the machine learning or predictive model. Compatible data types that may be operated on by the predictive model may include, but are not limited to, integers (int), floating-point numbers (float), Booleans, etc. FIG. 3 shows an exemplary table 300 that illustrates the transformation of input dimensions 304 to compatible data types 308. Input dimensions 304 may correspond to the fields in an application form that is submitted by an applicant to an insurance company. Input dimensions 304 may contain corresponding real values in the insurance system 306. Such real values 306 may be transformed to values represented as data types 308.

In some implementations, data preprocessor 122 further normalizes the transformed values to improve the accuracy of prediction. The transformed values t may be normalized to a predetermined range of 0 to 1 using, for example, a sigmoid function S(t), as follows:

$$S(t) = \frac{1}{1+e^{-t}}, \ w.r.t. \ S(t) \in [0, 1] \qquad (1)$$

Data preprocessor 122 may further divide the entire set of normalized transformed values into first, second and third portions for use in training, cross validation and accuracy testing. For example, data preprocessor 122 may randomly group 70%, 20% and 10% of the set of values into the first, second and third portions.

Figure 4:
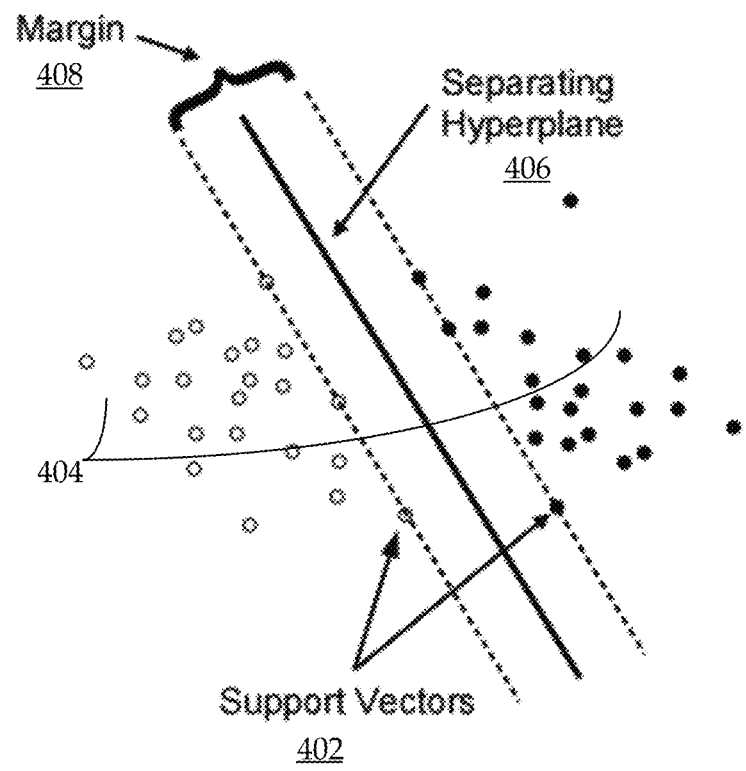
FIG. 4 illustrates an exemplary classification scenario.

At 204, data preprocessor 122 projects the preprocessed data to a higher dimensional space. In an underwriting case, the decision question is a binary classification problem. FIG. 4 illustrates an exemplary classification scenario. Support vectors 402 are distributed in a two-dimensional space 404. Classification involves determining an optimal separating hyperplane 406 between the two classes by maximizing the margin 408 between the classes' closest points.

Figure 5:
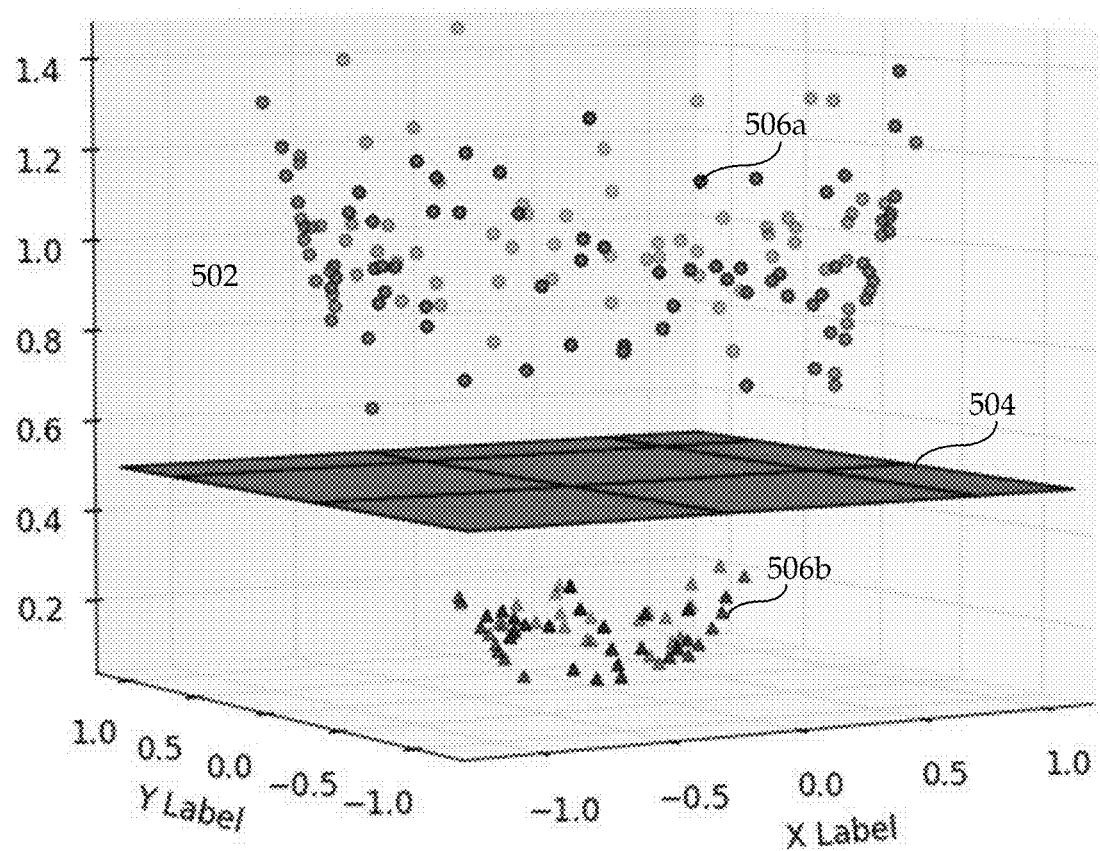
FIG. 5 illustrates an exemplary data projection scenario.

When a linear hyperplane cannot be found to separate two classes (i.e., classification is non-linear), the data may be projected into a higher dimensional space, i.e. into a space with three or more dimensions, to linearly separate the data in the presence of multiple input variables or features (e.g., insurance policy type, sales channel). A kernel function may be applied to the data to project to a higher dimensional space. In some implementations, the kernel function is a radial basis function (RBF). Other functions may also be used. FIG. 5 illustrates an exemplary projection of the data into a three-dimensional space 502. As shown, a linear hyperplane 504 separating the two classes of vectors 506a-b may be found. The X, Y and Z labels represent the results calculated by the kernel function based on the input variables.

At 206, risk analyzer 124 trains a predictive model using a first portion of the projected data. In some implementations, the predictive model is a supervised learning model such as a support vector machine (SVM) model. Given the set of training samples in the first portion of the projected data, each training sample is marked as belonging to one or the other of two classes. The SVM training algorithm builds a model that assigns new samples to one class or the other, making it a non-probabilistic binary linear classifier. As shown in FIG. 5, the SVM model maps the samples as vectors 506a-b in space 502 (e.g., three-dimensional space), such that the vectors 506a-b of the separate classes are divided by a clear margin that is as wide as possible. New samples are then mapped into that same space 502 and predicted to belong to a category based on which side of the margin they fall.

At 208, risk analyzer 124 cross validates the trained model using a second portion of the projected data. Before training the model, different data models may be defined. For example, different data models may be defined based on the Sigmoid function g( . . . ) as follows:

$$h_\theta(X)=g(\theta_0+\theta_1 X_1+\theta_2 X_2+\ldots+\theta_n X_n) \quad (2)$$

$$h_\theta(X)=g(\theta_0+\theta_1 X_1^2+\theta_2 X_2^2+\ldots+\theta_n X\theta_n^2) \quad (3)$$

$$h_\theta(X)=g(\theta_0+\theta_1 X_1+\theta_2 X_2+\ldots+\theta_n X_n+\theta_{n+1} X_1^2+\theta_{n+2} X_2^2+\ldots+\theta_{n+n} X_n^2)= \quad (4)$$

wherein $X_1$ to $X_n$ represent the input values and $\theta_0$ to $\theta_{n+n}$ represent the parameters of the Sigmoid function g( . . . ). How the data model is defined depends on, for example, the relationship between the input values. The goal of training the model is to find good parameters in the model to accurately predict unknown data. Cross-validation may be used to decide which data model to use and adjust the parameters in the data model. Each model may be trained with the training data to get the parameters θ. By performing cross-validation, the training errors are calculated to decide which data model and parameters θ to use. The smaller the training error is, the better the data model fits the data. Accordingly, the parameters are adjusted to avoid the overfitting problem, which occurs when a model does not fit the validation data (second portion) as well as it fits the training data (first portion). Overfitting is likely to happen when the size of the training data set is small, or when the number of parameters in the model is large.

At 210, risk analyzer 124 tests the accuracy of the cross-validated model using a third portion of the projected data. Accuracy is the proximity of the predicted values to the true values provided by the third portion of the projected data. Accuracy may be tested by applying the model to the input variables of the third portion of the projected data to generate prediction results, and comparing the prediction results to the known values in the third portion of the projected data. The risk analyzer 124 proceeds to the next step 212 if the accuracy of the trained model is above a predetermined value (e.g., 80%). If the accuracy falls below the predetermined value, steps 202 through 210 may be repeated to further train the model with additional input data.

At 212, risk analyzer 124 applies the trained model to current underwriting case to generate a decision recommendation and a fact-based summary. In some implementations, risk analyzer 124 provides an underwriting service (e.g., Java service) that is accessible at client device 156 via client application 158. An underwriter may submit data associated with a current underwriting case or an application for a financial product (e.g., insurance, loan) from a prospective customer via the client application 158. In response to the submission, risk analyzer 124 applies the predictive model to the current underwriting case to generate a decision recommendation and a fact-based summary. The decision recommendation and fact-based summary may be presented at, for example, the client device 156 via the client application 158 to facilitate underwriting decision-making. The client application 158 may present a user interface element (e.g., button) to enable the underwriter to indicate his or her final decision (e.g., Accept or Decline) after reviewing the decision recommendation and fact-based summary.

The decision recommendation proposes a response to the applicant of the current underwriting case. The response may indicate, for example, whether to Accept or Decline the application, a proposed insurance premium or interest rate (e.g., loan interest rate, fixed or variable), duration, and/or other terms of the financial product. Additionally, the decision recommendation may indicate the probability of the decision (e.g., probability of Accepting or Declining the application). The probability may be derived from the output of the sigmoid function S(t), which is between 0 and 1.

The fact-based summary may be derived from the parameters (or input dimensions) found in the cross-validation step 208. The fact-based summary describes one or more parameters that contribute most to the decision recommendation. For example, the fact-based summary may identify "high risk" parameters or factors (e.g., medical condition of applicant) that contribute most to a "Decline" decision recommendation. Based on the decision recommendation and the fact-based summary, the underwriter may choose to investigate these factors to further determine the final decision to Accept or Reject the application.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computing device for machine learning based risk analysis, comprising:
   a non-transitory memory device for storing computer-readable program code; and
   a processor in communication with the non-transitory memory device, the processor being operative with the computer-readable program code to perform operations comprising:
   (i) preprocessing input data of underwriting cases associated with applications for a financial product, wherein the preprocessing comprises transforming the input data to values of one or more data types that are compatible with a machine learning model, and the preprocessing comprises transforming a policy type, sales channel, acquisition type, and taxpayer information to respective integers,
   (ii) projecting the preprocessed input data to a three-dimensional space,
   (iii) training a predictive model using a first portion of the projected data,
   (iv) cross-validating the trained predictive model using a second portion of the projected data,
   (v) testing accuracy of the cross-validated trained predictive model using a third portion of the projected data, and
   (vi) applying the tested cross-validated trained predictive model to a current underwriting case to generate a decision recommendation and a fact-based summary.

2. The computing device of claim 1 wherein the input data comprises:
   type of financial product applied for,
   sales channel,
   acquisition type,
   applicant type,
   calculation rule type,
   country, and
   applicant information.

3. The computing device of claim 1 wherein the processor is operative with the computer-readable program code to apply the tested cross-validated trained predictive model to the current underwriting case in response to the accuracy reaching above a predetermined value.

4. The computing device of claim 1 wherein the processor is operative with the computer-readable program code to repeat operations (i) through (v) in response to the accuracy falling below a predetermined value.

5. A computer-implemented method of machine learning-based risk analysis and decision automation in intelligent underwriting, the method comprising:
in a computing environment with access to a predictive model created via (a)-(c):
(a) preprocessing input data of underwriting cases, wherein the preprocessing comprises transforming input data comprising policy type, sales channel, acquisition type, and taxpayer information to values of one or more data types that are compatible with the predictive model;
(b) projecting the preprocessed input data to a higher dimensional space; and
(c) training the predictive model using a first portion of the projected data, wherein the predictive model is configured to output a probability of accepting or declining an application,
submitting a request for applying the trained predictive model to a current underwriting case, wherein the applying generates, from the trained predictive model, a decision recommendation to accept or decline the application, the probability of accepting or declining the application, and a fact-based summary associated with the decision recommendation for the current underwriting case;
presenting the decision recommendation to accept or decline the application, the probability of accepting or declining the application, and the fact-based summary associated with the decision recommendation for the current underwriting case, wherein the decision recommendation to accept or decline the application proposes a response to an applicant of the current underwriting case; and
presenting a user interface element configured to receive a final accept or decline decision for inclusion in the response to the applicant of the current underwriting case, after reviewing the decision recommendation, the probability of accepting or declining the application, and the fact-based summary associated with the decision recommendation for the current underwriting case.

6. The method of claim 5 wherein preprocessing the input data comprises transforming the input data to values of one or more data types that are compatible with the predictive model.

7. The method of claim 6 wherein preprocessing the input data further comprises normalizing the transformed values to a predetermined range.

8. The method of claim 5 wherein projecting the preprocessed input data to the higher dimensional space comprises projecting the preprocessed input data to a three-dimensional space.

9. The method of claim 5 wherein projecting the preprocessed input data to the higher dimensional space comprises applying a kernel function to the preprocessed input data.

10. The method of claim 9 wherein applying the kernel function to the preprocessed input data comprises applying a radial basis function to the preprocessed input data.

11. The method of claim 5 further comprises cross-validating the trained predictive model using a second portion of the projected data.

12. The method of claim 11 wherein cross-validating the trained predictive model comprises adjusting parameters of a data model based on a Sigmoid function.

13. The method of claim 11 further comprises testing accuracy of the cross-validated predictive model using a third portion of the projected data.

14. The method of claim 13 wherein testing the accuracy of the cross-validated predictive model comprises:
applying the cross-validated predictive model to input variables of the third portion of the projected data to generate prediction results; and
comparing the prediction results to known values in the third portion of the projected data.

15. The method of claim 5 wherein applying the predictive model to the current underwriting case further comprises generating recommended terms of a financial product.

16. The method of claim 5 wherein the fact-based summary identifies one or more parameters that contribute most to the decision recommendation.

17. The method of claim 5, wherein:
a client application presents the decision recommendation to accept or decline the application, the probability of accepting or declining the application, and the fact-based summary associated with the decision recommendation for the current underwriting case; and
the client application presents the user interface element configured to receive a final accept or decline decision for the current underwriting case.

18. The method of claim 17 wherein:
the predictive model is provided as an underwriting service accessible at a client device via the client application.

19. One or more non-transitory computer readable media embodying a program of instructions executable by machine to perform steps comprising:
in a computing environment with access to a predictive model created via (a)-(c):
(a) preprocessing input data of underwriting cases, wherein the preprocessing comprises transforming input data comprising policy type, sales channel, acquisition type, and taxpayer information to values of one or more data types that are compatible with the predictive model;
(b) projecting the preprocessed input data to a higher dimensional space; and
(c) training the predictive model using a first portion of the projected data, wherein the predictive model is configured to output a probability of accepting or declining an application,
from a client device executing a client application, submitting a request to a service for applying the trained predictive model to a current underwriting case, wherein the applying generates, from the trained predictive model, a decision recommendation to accept or decline the application, the probability of accepting or declining the application, and a fact-based summary for the current underwriting case, wherein the fact-based summary describes one or more parameters that contribute most to the decision recommendation;
by the client application, presenting the decision recommendation to accept or decline the application, the probability of accepting or declining the application, and the fact-based summary associated with the decision recommendation for the current underwriting case, wherein the decision recommendation to accept or decline the application proposes a response to an applicant of the current underwriting case;

by the client application, presenting a user interface element configured to receive a final accept/decline decision for inclusion in the response to the applicant of the current underwriting case after review of the decision recommendation, the probability of accepting or declining the application, and fact-based summary.

\* \* \* \* \*